United States Patent
Lindia et al.

(10) Patent No.: US 8,744,904 B2
(45) Date of Patent: Jun. 3, 2014

(54) EMPLOYEE PERFORMANCE MONITORING SYSTEM

(75) Inventors: Stephen A. Lindia, Stamford, CT (US); Simeon Morfe, Summit, NJ (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 09/870,865

(22) Filed: May 31, 2001

(65) Prior Publication Data

US 2002/0184085 A1    Dec. 5, 2002

(51) Int. Cl.
*G06Q 10/00*    (2012.01)
(52) U.S. Cl.
USPC ........................................ 705/7.42
(58) Field of Classification Search
USPC .................................. 705/11, 7.42
See application file for complete search history.

(56) References Cited

U.S. PATENT DOCUMENTS

| | | | |
|---|---|---|---|
| 6,119,097 A * | 9/2000 | Ibarra | 705/11 |
| 6,269,355 B1 * | 7/2001 | Grimse et al. | 706/46 |
| 6,615,182 B1 * | 9/2003 | Powers et al. | 705/7 |
| 6,735,570 B1 * | 5/2004 | Lacy et al. | 705/7 |
| 6,850,924 B2 * | 2/2005 | Grimse et al. | 706/59 |
| 6,853,975 B1 * | 2/2005 | Dirksen et al. | 705/11 |
| 6,865,581 B1 * | 3/2005 | Cloninger et al. | 707/104.1 |
| 2002/0019765 A1 * | 2/2002 | Mann et al. | 705/11 |
| 2002/0023064 A1 * | 2/2002 | Grimse et al. | 706/19 |

OTHER PUBLICATIONS

Bracken, David W.; Summers, Lynn; Fleenor, John. High-tech 360. Training & Development. Alexandria: Aug. 1998. vol. 52, Iss 8, p. 42.*
Huet-Cox, G. Douglas; Nielsen, Tjai M.; Sundstrom, Eric. Get the most from 360-degree feedback: Put it on the Internet. HRMagazine. alexandria: May 1999. vol. 44, Iss. 5, p. 92.*
Meade, Jim. Visual 360: A performance appraisal system that's fun. HRMagazine. Alexandria: Jul. 1999. vol. 44, Iss 7, p. 118.*
Meyer, Gary. 360 on the Net: A computer toolkit for multirater Performance feedback. HRMagazine. Alexandria. Oct. 1998. vol. 43, Iss. 11, p. 46.*

* cited by examiner

*Primary Examiner* — Johnna Loftis
(74) *Attorney, Agent, or Firm* — Perkins Coie LLP

(57) ABSTRACT

A fully automated 360° employee review system that is suitable for corporate intranet or Web-based Internet applications. The system enables multi-perspective employee data collection from various sources such as an employee's superiors, peers, subordinates, clients and the employee himself. The system also permits a participant to select persons whose employment performance the employee desires to review but is not obligated to review. The system requires a managerial approval or denial both the reviewers an employee may select to review his or her performance and the reviewees the reviewer chooses to review. The system also permits managers or mentors to receive interim employee performance feedback and generate interim employee action plans between annual performance evaluations. In addition, the system permits a user to download the application and participate in the system's employee performance surveys while offline and disconnected from the corporate intranet or the World Wide Web.

31 Claims, 18 Drawing Sheets

Reviewee: [Combs, Randy]   Reviewer: [Rosen, David]

Reviews 2001 - Category Listing

Click on a Category Name or Rating to Continue

Key Interaction Information
Review Type: Downward   Exposure: Moderate   When: Jan 2000–Dec 2000

|  | SE | E | M | PM | DNM | N/A |  |
|---|---|---|---|---|---|---|---|

I. Skills Base
- A. Technical Skills — Exceeds
- B. Communication Skills — Rating Not Specified
- C. Approach to Work — Rating Not Specified
- D. Judgment — Partially Meets

II. Internal Leadership and Contribution

| SE | E | M | PM | DNM | N/A |
|---|---|---|---|---|---|

- A. Teamwork — Rating Not Specified
- B. Managerial Skills — Rating Not Specified
- C. Leadership Qualities — Rating Not Specified
- D. Recruiting, Training and Mentoring — Rating Not Specified

III. Commercial Contribution and External Leadership
- A. Execution Skills — Rating Not Specified
- B. Commercial Effectiveness/Marketing Skills — Partially Meets

IV. Trend Since Last Review
Performance Relative to Last Performance Review — Rating Not Specified

V. Overall Performance Rating
Performance Relative to Last Performance Review — Rating Not Specified

[ Spell Check ]   [ Mark as "In Progress" ]   [ Mark as "Completed" ]   [ Next >> ]

FIG. 3

Reviewee: Combs, Randy   Reviewer: Rosen, David

Key Interaction Information - Must Be Completed

Review Type (select one)

○ Upward   ○ Peer   ⦿ Downward

Extends of Exposure (select one)

○ Extensive   ⦿ Moderate   ○ Limited

Indicate When You worked With Reviewee (select one)

⦿ All Year   ○ Part of the year

If You Worked With Reviewee Only Part of the Year, Indicate Which Quarters (select ALL that apply)

☑ Jan 2000-Mar 2000   ☑ Apr 2000-Jun 2000   ☑ Jul 2000-Sep 2000   ☑ Oct 2000-Dec 2000

Next>>

FIG. 4

Reviewee: Combs, Randy          Reviewer: Rosen, David

1. Skills Base
   A. Technical Skills

ALL BANKERS
   ■ Possesses raw intelligence
   ■ Demonstrates knowledge of finance, accounting and valuation practices necessary to execute assignments
   ■ Embraces new technologies
   ■ Utilizes available tools effectively and creatively
   ALL SYSTEMS/ADMIN PROFESSIONALS
   ■ Possesses raw intelligence
   ■ Embraces new technologies
   ■ Utilizes available tools effectively and creatively
   ■ Demonstrates a thorough working knowledge of her/his functional responsibilities
   ■ Evidences the appropriate understanding of the businesses being supported
   ADDITIONAL EMPHASIS FOR VICE PRESIDENTS AND MANAGING DIRECTORS
   ■ Demonstrates knowledge of clients' business/industry and products and applies them to solve problems Performance Rating Relative to Expectations for Peer Group
   ○ Substantially Exceeds  ● Exceeds  ○ Meets  ○ Partially Meets  ○ Does Not Meet  ○ Unable to Judge The space below is for feedback you have on this or any other category. Please include specific, actionable input and/or the types of assignment/roles/responsibilities you think would be beneficial to consider in the reviewee's development plan. The comments you enter will accumulate in this box as you enter feedback for one or more categories.

[<< Previous]   [Return to Category Listing]   [Hide Comments]   [Next >>]

Reviewee: Combs, Randy    Reviewer: Rosen, David

V. Overall Evaluation/Future Potential
Effective Aspects of Performance

Top Strengths: Detail below the 3-5 strongest, most effective aspects of the reviewee's performance.

Actionable Areas for Development: Detail below the 3-5 most important areas of development which, if not addressed, could impede the reviewee's professional growth. Provide feedback that is specific and actionable.

Additional Comments: Provide below any additional input which should be considered. Included specific comments related to any of the review sections (I,II,or III) and/or the types of assignments you think would be beneficial to consider in the reviewee's development plan.

<< Previous    Return to Category Listing    Next >>

FIG. 8

Reviewee: Combs, Randy    Reviewer: Rosen, David

V. Overall Evaluation/Future Potential
Overall Performance Rating

ALL REVIEWERS
This section should be completed only if you have worked with the reviewee on a broad enough basis to have a comprehensive perspective. This "Overall rating" is a summary assessment of the reviewee's performance and potential. It should represent a composite picture which is consistent with the ratings provided in the individual categories above. In particular, please bear in mind the following: judgment, citizenship, teamwork, professionalism in dealing with colleagues and clients, pride in work, ethical and work standards and credibility.

Performance Rating relative to Expectations for Peer Group

○ Substantially Exceeds    ● Exceeds    ○ Meets    ○ Partially Meets    ○ Does Not Meet    ○ Unable to Judge Justify your "overall evaluation" rating in the space below in no more than 3 or 4 sentences. Do not duplicate comments provided elsewhere in this review. However, if your other feedback does not convey clearly and fully the rationale for the "Overall Evaluation" rating you have given the reviewee, provide that commentary below.

[<< Previous]    [Return to Category Listing]    [Next >>]

FIG. 9

Reviewer: Rosen, David

Reviews 2001 - Overall Performance Summary

This grid displays the distribution of the "Overall Performance" ratings you have given to your reviewees. Only those reviews which are either "Completed" or "In Progress" are reflected. Reviews which remain "Unopened" are not included in this summary.

Use this summary to confirm that each individual's "Overall Performance" rating is consistent with the ratings you gave her/him in the specific performance categories and that the "Overall" rating you have given your reviewees are calibrated properly -- not only relative to each other but also relative to the standards against which their peers are being measured by all reviewers.

You can return to a specific review to see your category-specific ratings by first clicking on the reviewee's name and then clicking "Open Selected Evaluation" below or double-clicking on the reviewee's name.

| Substantially Exceeds | Exceeds | Meets | Partially Meets | Does Not Meets | No Rating Given or N/A |
|---|---|---|---|---|---|
| Wonders, Robert | Charles, Phil | Gingers, Fred<br>Marmaduke, Jollie | Agnosk, Edmond<br>Vivaldi, Nora | Agnosk, Edmond | Agnosk, Edmond<br>Bourke, Winny<br>Cheos, Larry<br>Combs, Randy<br>Cummings, Posie<br>Fallen, George<br>Feinstein, Harvey<br>Floss, Avery<br>Goins, Bill<br>Grange, Gilbert<br>Greenfeld, Otto<br>Hasselmann, Jean |

[Open Selected Evaluation]    [Return to Reviewee List]

FIG. 10

Reviews 2001 - Print Preview

HIGHLY CONFIDENTIAL
2001 Performance Evaluation Form

Reviewee: Combs, Randy
Reviewee Dept: HC
Review Title: Vice President
Exposure Level: Moderate
Interaction Period: Jan 2000–Dec 2000

Reviewer: Rosen, David
Reviewee Dept: IBS
Review Title: Vice President
Review Direction: Downward

| | Substantially Exceeds | Exceeds | Meets | Partially Meets | Does Not Meets | N/A |
|---|---|---|---|---|---|---|
| I. Skills Base | | | | | | |
| A. Technical Skills | ☐ | ☒ | ☐ | ☐ | ☐ | ☐ |
| B. Communication Skills | ☐ | ☐ | ☐ | ☐ | ☐ | ☐ |
| C. Approach to Work | ☐ | ☐ | ☐ | ☐ | ☐ | ☐ |
| D. Judgment | ☐ | ☐ | ☐ | ☐ | ☐ | ☐ |
| II. Internal Leadership and Contribution | Substantially Exceeds | Exceeds | Meets | Partially Meets | Does Not Meets | N/A |
| A. Teamwork | ☐ | ☐ | ☐ | ☒ | ☐ | ☐ |
| B. Managerial Skills | ☐ | ☐ | ☐ | ☐ | ☐ | ☐ |
| C. Leadership Qualities | ☐ | ☐ | ☐ | ☐ | ☐ | ☐ |
| D. Recruiting, Training and Mentoring | ☐ | ☐ | ☐ | ☐ | ☐ | ☐ |
| III. Commercial Contribution and External Leadership | Substantially Exceeds | Exceeds | Meets | Partially Meets | Does Not Meets | N/A |
| A. Execution Skills | ☐ | ☐ | ☐ | ☒ | ☐ | ☐ |
| B. Commercial Effectiveness/Marketing Skills | ☐ | ☐ | ☐ | N/A | ☐ | ☐ |
| IV. Trend Since Last Review | Up | Unchanged | Down | | | |
| | ☐ | ☐ | ☐ | | | |
| Performance Relative to Last Performance Review | | | | | | |

[Preview Next Review] — 174
[Return to Reviewee list] — 176

Reviewer: Rosen, David — 180

Reviews 2001 - Review Status Summary

Professional Reviews 2000

| | Number on Reviewee List | In Progress | Completed | To Be Handwritten |
|---|---|---|---|---|
| Priority Reviews | 45 | 15 | 15 | 0 |
| Additional Reviews Requested of You | 10 | 0 | 1 | 0 |
| Reviews You Have Added | 25 | 0 | 2 | 0 |
| Total | 80 | 15 | 18 | 0 |
| Self Evaluation | 1 | 0 | 0 | 0 |

Return to Reviewee List — 182

Reviews 2001 - Add Reviewee

| | | | |
|---|---|---|---|
| A B C D E F G H I J K L M N O P Q R S T U V W X Y Z | | | |
| Name | Title | Dept | Location |
| Haas, Julie | Vice President | CF | New York |
| Haberman, Paul | Vice President | LEG | New York |
| Hadon, Simon | Managing Director | HC | New York |
| Hallman, Vince | Advisor | ICA | London |
| Hallow, Margaret | Associate | IBS | Stockholm |
| Halprin, Sinbad | Vice President | FIRG | New York |
| Hammerstein, Any | Administrator | BSS | London |
| Hammonds, Carl | Managing Director | IBS | New York |
| Hanger, Cliff | Analyst | RMG | London |
| Hans, Dan | Analyst | CF | New York |
| Hanson, Mary | Associate | AG | Tokyo |
| Happ, Sal | Associate | MA | New York |
| Harequin, Nicholas | Managing Director | AG | Tokyo |
| Harm, Randi | Analyst | CF | Sydney |
| Harman, Pete | Vice President | CMT | London |
| Harmon, Robert | Managing Director | CF | New York |
| Harper, Eileen | Librarian | LIB | New York |
| Harrison, Jim | Vice President | FIG | New York |
| Harvey, Bill | Managing Director | CME | New York |
| Hassan, Herbert | Analyst | PIA | Hong Kong |

186 — alphabet bar
184 — Hanger, Cliff row
188 — Add Reviewee
190 — Cancel

Interaction Checklist

Checklist for:
Shoenfeld, Derek
Vice President – SYS

| Preloaded Interactions | Summary of Interactions | Guidelines |

Section I
Reviews Written of You

Priority Review: 8
Review Requests: 5

Section II
Reviews Written by You

Committed to Write: 12

Section I — Reviews Written Of You

| Priority Reviews (8) | Review Requested (5) | My Review Not Needed (186) |
|---|---|---|
| Abby, William | Anderson, Donald | Alps, Andrew |
| Atari, Sam | Liddle, Stern | Ashton, Michael |
| Banes, George | Tochis, Chris | Aster, Hank |
| Bear, B.J. | Williams, Mookie | Atton, Yon |
| Ferraro, Tom | Wolf, Jillian | Ayers, Lori |
| Fiori, Greg | | Backer, Phil |
| Shannon, Rommi | | Badge, Jack |
| Volvano, Bob | | Band, Adam |
| | | Banes, Harold |
| | | Barget, Steve |
| | | Baste, Michael |
| | | Beek, Chuck |
| | | Benten, Jan |
| | | Bernstein, Rick |
| | | Bidge, Paul |
| | | Biggio, Craig |
| | | Bloch, Carol |
| | | Breter, Scott |
| | | Brett, Karl |
| | | Browne, Jim |

Section II — Reviews Written By You

| Reviews I Commit To Write (12) | My Review Not Needed (188) |
|---|---|
| Anderson, Donald | Abby, William |
| Bear, B.J. | Alan, Sam |
| Ferraro, Tom | Ashton, Michael |
| Fiori, Greg | Aster, Hank |
| Josephs, Kip | Atton, Yon |
| Justice, Jake | Ayers, Lori |
| Liddle, Stern | Backer, Phil |
| Shannon, Rommi | Badge, Jack |
| Suzuki, Otto | Band, Adam |
| Volvano, Bob | Banes, George |
| Wolf, Jillian | Banes, Harold |
| Worf, Ashley | Barget, Steve |
| | Baste, Michael |
| | Beek, Chuck |
| | Benten, Jan |
| | Bernstein, Rick |
| | Bidge, Paul |
| | Biggio, Craig |
| | Bloch, Carol |
| | Breter, Scott |

| Help | Print Interactions | Exit Checklist | Submit Checklist |

Non-Roster Employee Information

Surname: Smith — 266, 268
First Name: John
Client: — 270, 272
Product:
Title: Analyst — 274, 276
Office: New York
Division: IB — 278, 280
Department: CF - Corporate Finance EXPLANATION: Please describe succinctly the nature of your interaction with this person and the significance of his/her input in your performance feedback, including a very brief description of the role/function he or she plays in his/her division. — 264 worked with John for 6 months... — 282

OK — 284
Cancel — 286

FIG. 18

EMPLOYEE PERFORMANCE MONITORING SYSTEM

FIELD OF THE INVENTION

The present invention relates in general to systems for monitoring employee performance and, in particular, to a 360° system for monitoring employee performance that is network-based and which reduces evaluation bias and corruption and increases compliance with the employee performance evaluation program by both reviewers and reviewees participating in the system.

BACKGROUND OF THE INVENTION

Systems and methods for monitoring employee performance in the workplace are well known and widely practiced. Perhaps the oldest and simplest example is a unilateral and largely subjective review of an employee by one or more of his or her superiors. A more objective system is a so-called 360° employee performance review system. A 360° employee review system is a multi-perspective data collection process that can apply to both developmental feedback and performance review feedback data collection. Multi-perspective data collection may be defined as assessments collected from various sources such as one's superiors, peers, subordinates, clients and an individuals own perspective on his or her skills, accomplishments and other job-related behavior and activities. Although not limited thereto, 360° employee review systems are particularly well-suited to evaluation of service sector employees heavily involved in client/customer interaction such as financial advisors, brokers, bankers, lawyers, and so on. A 360° employee review system is considered to be more accurate and less biased than simple review of an employee by one or more managers.

Until recently, however, conventional 360° employee reviews were conducted as paper-based review processes or as hybrid paper-electronic processes. For instance, a typical 360° employee review data collection process might include data obtained from questions presented via paper surveys questionnaires, surveys stored on computer disk, or verbal and/or e-mail exchanges between the reviewer and reviewee. Because of the numerous people that might be involved in 360° employee evaluation, and also because of non-uniformities and redundancies in the data collection process, the review process was onerous, took a long time to complete and the rate of compliance by participants in the system was less than desirable.

Moreover, because of perceived or actual inequalities in the data collection process, e.g., possible collusion between certain reviewees and reviewers or certain verbal, electronic mail or voice mail statements made via during data collection, many reviewees viewed 360° employee review processes with skepticism and considered them to be unfair and even corrupt. These perceptions, whether or not validated, could expose the employer to claims of employment discrimination or other litigation.

In addition, it is commonplace in typical 360° employee review programs for employees to be asked to conduct "direct reports" performance evaluations, i.e., evaluations of their manager. Unless an employee's comments about his or her manager are held in strict confidence, such comments may not be as candid as they could be in order to provide an accurate assessment of the manager's job performance.

Examples of improvements over conventional 360° employee review systems are the 360° Feedback® process marketed by TEAMS International of Tempe, Ariz. and the Visual 360® process marketed by MindSolve Technologies, Inc. of Gainesvillle, Fla. The 360° Feedback® and Visual 360® processes are available in fully automated forms as client-server applications operable on a corporate intranet or via the Internet. The processes are implemented by software that includes interactive and confidential employee performance and development surveys. To reduce the likelihood of "gaming" the system, i.e., collusion between reviewers and reviewees, the 360° Feedback® and Visual 360® processes require supervisor approval or denial of the reviewers an employee may select to review his or her performance. Additionally, the Web-based 360° Feedback® and Visual 360® processes provide online summaries of employee performance, and the Web-based 360° Feedback® service generates preprogrammed or customized action plans to support the future professional development of reviewees.

Although the 360° Feedback® and Visual 360® processes possess several advantages over conventional 360° employee review programs in terms of ease of use, uniformity, participant compliance, confidentiality and actual and perceived fairness, they do not permit a participant to select persons whose employment performance he or she desires to review but is not obligated to review. Obligatory reviews are those conducted by managers of employees over which they have direct supervision. As a consequence, the 360° Feedback® and Visual 360® processes do not permit individuals who may have substantial knowledge of a person's employment performance, e.g., colleagues from within and outside of a person's employment department, from providing input that may be useful in evaluating that person.

Furthermore, the 360° Feedback® and Visual 360® software is designed for gathering large volumes of employee performance data and providing an enterprise with comprehensive employee performance information and action plans. That is, the scope of their coverage and the demands they place on participants are such that practical implementation of such programs are limited to very infrequent, e.g., yearly, surveys. Accordingly, they do not permit managers or mentors to receive interim feedback and generate interim action plans that could be used to constructively modify an employee's habits or behavior before they become serious problems that otherwise might not be discovered until the employee's yearly annual performance evaluation.

Additionally, the 360° Feedback® and Visual 360® systems in their corporate intranet and Web-based applications require a user to be online and connected to either the corporate intranet or the World Wide Web in order to interact with and participate in the employee performance surveys. They do not allow a user to participant to interact with the systems offline which in turn limits the flexibility of the systems and, to a certain extent, the survey response/compliance rate.

An advantage exists, therefore, for a fully automated 360° employee review system that is suitable for corporate intranet or Web-based applications that permits a participant to select persons whose employment performance he or she desires to review but is not obligated to review.

A further advantage exists for a fully automated 360° employee review system that permits managers or mentors to receive interim employee performance feedback and generate interim employee action plans between annual performance evaluations.

A further advantage exists for a fully automated 360° employee review system that is suitable for corporate intranet or Web-based applications and yet permits a user to download the application and participate in the system's employee performance surveys while offline and disconnected from the corporate intranet or the World Wide Web.

SUMMARY OF THE INVENTION

The present invention provides a fully automated 360° employee review system that is suitable for corporate intranet or Web-based Internet applications. The system enables multi-perspective employee data collection from various sources such as an employee's superiors, peers, subordinates, clients and the employee himself. The system also permits a participant to select persons whose employment performance he or she desires to review but is not obligated to review. The system requires a manager or supervisor to approve or deny both the reviewers an employee may select to review his or her performance and the reviewees the reviewer chooses to review. Additionally, the system provides online summaries of employee performance and generates pre-programmed or customized action plans to support the future professional development of reviewees. The system also permits managers or mentors to receive interim employee performance feedback and generate interim employee action plans between annual performance evaluations. In addition, the system permits a user to download the application and participate in the system's employee performance surveys while offline and disconnected from the corporate intranet or the World Wide Web.

Other details, objects and advantages of the present invention will become apparent from reference to the supplemental information contained in Attachment A and as the following description of the presently preferred embodiments and presently preferred methods of practicing the invention proceeds.

BRIEF DESCRIPTION OF THE DRAWINGS

The invention will become more readily apparent from the following description of preferred embodiments shown, by way of example only, in the accompanying drawings wherein:

FIG. 3 is a computer generated window of an overall job related category and rating format according to the system;

FIG. 4 is a computer generated window which allows a reviewer to input reviewee interaction information into the system;

FIG. 5 is a computer generated window defining standards for rating a reviewee relative to a reviewee's peer group for a specific job/profession and for allowing a reviewer to input such rating into the system;

FIG. 6 is a computer generated window for enabling a reviewer to assign a reviewee a rating for a specific job related category using the system;

FIG. 8 is a computer generated window for enabling a reviewer to input comments regarding a reviewee's effective aspects of performance into the system;

FIG. 9 is a computer generated window for enabling a reviewer to input into the system an overall performance rating for a reviewee relative to a reviewee's peer group;

FIG. 10 is a computer generated window of an overall performance summary of reviewees reviewed by a management-reviewer using the system;

FIG. 11 is a computer generated print review window in HTML protocol of a particular reviewee's job performance rating;

FIG. 12 is a computer generated window of a numerical status report of the reviews completed or to be completed by a reviewer;

FIG. 13 is a computer generated window for enabling a reviewer to input reviewees to be reviewed that are not already preloaded into the reviewer's review book;

FIG. 14 is a computer generated window including a preloaded list of colleagues with which the participant has had substantial job-related interactions and non-preloaded colleagues added by the reviewer with which the participant has had substantial job-related interactions that enables the participant to select persons whom the participant wishes to review his or her job performance (reviewers) and to select persons whose job performance the participant wishes to review (reviewees);

FIG. 15 is a computer generated window summarizing those persons whom the participant has and has not selected to review his or her job performance (reviewers) and those persons whose job performance the participant has or has not selected to review (reviewees);

FIG. 17 is a computer generated window for enabling a participant to search add non-roster persons to his or her reviewer or reviewee lists; and FIG. 18 is a computer generated window similar to that shown in FIG. 14 as would appear on a laptop computer when a participant is using the system while offline and disconnected from a corporate intranet or the World Wide Web.

DETAILED DESCRIPTION OF THE INVENTION

Figure 1:
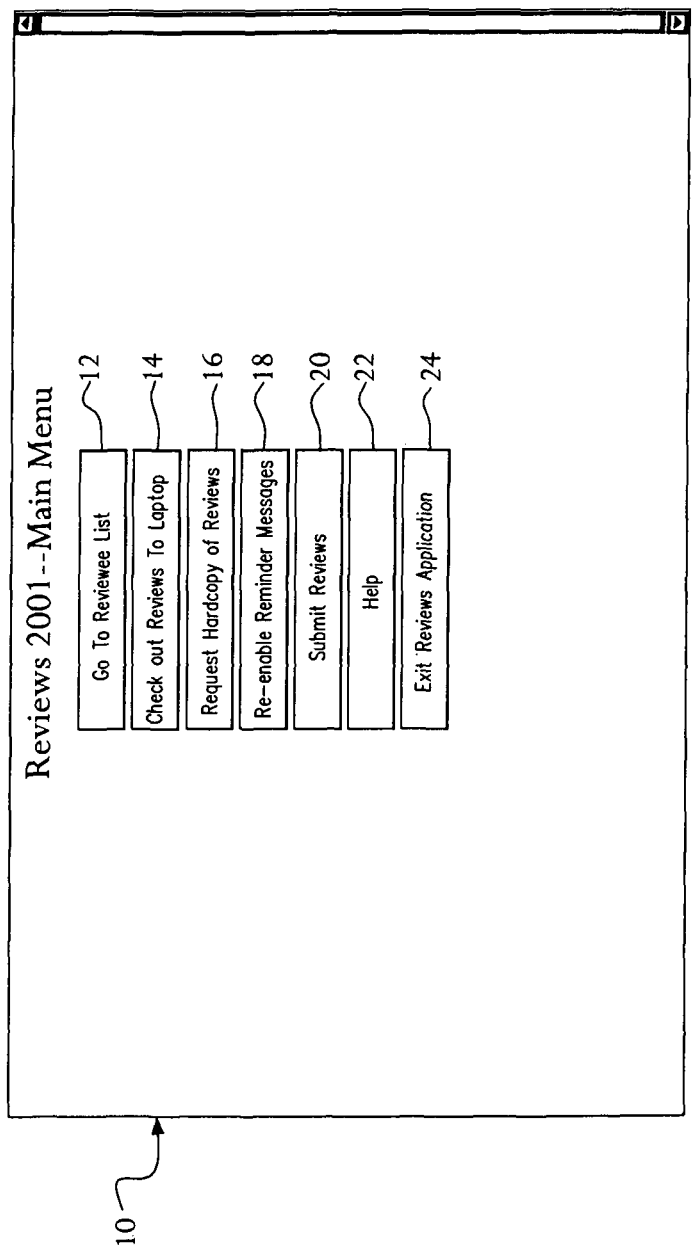
FIG. 1 is a computer generated window of an introductory menu of a fully automated 360° employee performance monitoring system according to the present invention ("system")

The present invention provides a reliable, efficient and fully automated system for collecting, processing, and reporting exempt and non-exempt employee performance data using a 360° multi-perspective approach. If wholly adopted and implemented by a business enterprise, the system can reduce or even eliminate reliance on a paper-based, manual employee job performance evaluation processes. In relation to conventional 360° employee review processes, the instant invention can dramatically increase the response rate of returned reviews, maintain fairness in the data collection process, and improve the integrity of the potentially vast quantity of data that may be generated as a result of a highly complex process such as a large corporation's annual employee performance review program.

There currently exists no systematic process for sending performance review summaries to managers/mentors, collecting, reviewing, editing, storing and retrieving employee action plans, and providing managers/mentors with an interim feedback process to supplement the annual performance review process.

Generally, the system comprises a series of corporate intranet based or Web-based software applications or modules used to facilitate and enhance a business entity's yearly performance review process. According to the invention, the annual review process is divided into four distinct phases including: (1) the interaction checklist process, (2) the review writing process, (3) data processing and reporting, and (4) performance summary data presentation, action planning and interim-feedback process.

According to a presently preferred embodiment of the invention, the interaction checklist process uses an application that may be accessed and interacted with by using a standard Web browser such as Netscape Navigator® or Microsoft Internet Explorer or from the homepage a business entity's intranet. Preferably, there are no robust client-server interactions. That is to say, the only business intelligence is a JAVA applet or similar component that is downloaded each time the operator opens the browser. Thus, any machine on any desktop or any portable computer, even relatively "dumb" machines, given the right levels of security, can run the system. In this way the model is easily scalable across hundreds or even thousands of machines. Access is controlled by the user's login and password.

Except as described in connection with FIG. 18, the hardware, operating systems, communication networks and other infrastructure do not per se form a part of the present invention and thus will not be described in detail. However, the following is offered as a representative infrastructural context within which the present system would find likely and beneficial application.

The present system may function on any general purpose computer(s) or server(s) configured with appropriate proprietary or commercially available software suitable to enable a user with appropriate security clearance to access, query and/or modify the system's database. Preferably, the system is highly scalable, whereby any number of users may be readily connected to and participate in the system. Further, the system architecture may be portable and capable of being run on a variety of software systems platforms such as Windows NT®, UNIX, etc.

The system may comprise a flexible and adaptable architecture that employs any suitable object-oriented programming language such as, for example, JAVA or C++. And, the system may operate on any electronic communication network capable of enabling interactive participation by users of the system. Examples of communication networks that may support the system include the Internet, a proprietary network (company intranet), a local or wide area network, a wireless network, a telephone network, etc. By way of illustration but not limitation, the system may be a World Wide Web (Web) based system functioning on the Internet. As is conventional, the system comprises user computer interfaces, e.g., workstations, personal computers, laptops, through which users may communicate with the system's server(s) which, in turn, communicate with the system's database(s). Likewise, the system further includes a communication network services integrator appropriate for the communication network within which the system is implemented. For example, in a Web-based environment, the communication network services integrator may be the user interface, program logic, data and Web server applications marketed by Oracle Corp. of Redwood Shores, Calif.

The means for supporting, enabling and executing the many desirable functions of the application software of the present invention are embedded in its source and object codes. The physical manifestations of those means and their functions are reflected in the drawing figures. Accordingly, referring to FIG. 1, there is shown an introductory or main menu 10 window through which a participant initially interacts with the application. Preferably, a user will connect to the application via a hyperlink or Web address and the identity of the user is automatically determined from the environment. Alternatively, connection with the application may be through a conventional access window containing "USER" and "PASSWORD" text boxes in the manner known in the art. Main menu 10 is the launching point for the application and comprises a plurality of action buttons that allow a user to quickly access certain frequently deployed functions or aspects of the application.

Figure 14:
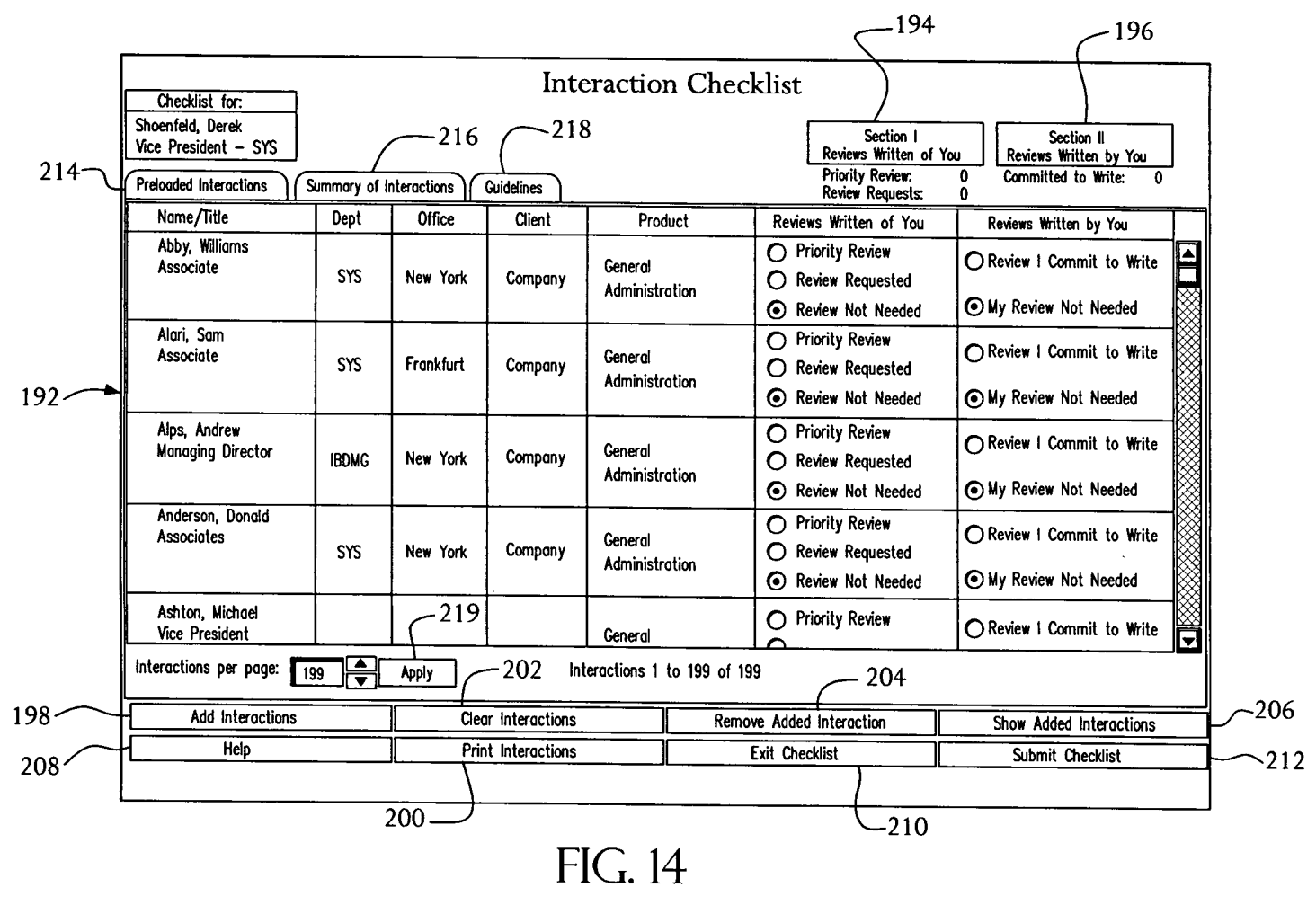

According to a presently preferred embodiment, main menu 10 includes a Go To Reviewee List button 12 that a user clicks on to access the preloaded lists of colleagues with which the participant has had job-related interactions and which the participant wishes to review (reviewees) as illustrated in FIG. 14 Main menu 10 further preferably includes a Check-out Reviews To Laptop button 14 that a user clicks on to check-out reviews to a laptop or other portable computer whereby the user work on an employment performance questionnaire or survey programmed into the application while offline and disconnected from a corporate intranet or the World Wide Web.

A Request Hardcopy or similar print button 16 may be provided to permit a user to obtain a printed report of the reviews that he or she has written or is in the process of writing. The printout of interactions will display the same information as the "Summary of Interactions" tab 216 of the application described later herein in connection with FIG. 14. Preferably, the window displayed and printed paper checklists are identical in format to facilitate proofreading and comparison of key entries.

Main menu 10 additionally preferably includes a toggle button 18 to allow a user to Re-Enable and Disable Reminder Messages. Generally, reminder messages include not only reminders but also warning and error messages that assist a reviewer in using the present system. Many guidance messages may be employed by the system. A few non-limitative examples might include: select "all year" or "part year" review, insert floppy disk to backup reviews, insufficient qualitative feedback, cannot print reviews-checked out to laptop, reviewee cannot be added, self-review incomplete, priority reviews incomplete, reviewee job category possibly inappropriate, all reviews complete, etc.

A Submit Reviews button 20 is provided for submitting the participant's collection of reviews that he has made of his or her colleagues' employment performance for processing and storage. During the submission process, the user will be surveyed on whether he or she desires to use paper or electronic reviews. If paper, the user will be required to enter a reason. This reason will be recorded in the database and statistics on paper and electronic reviews submissions will be stored in logs.

A self-evident Help button 22 is provided to assist the user with questions he or she may have while running the application. And, clicking on the Exit Reviews Application button 24 allows the user to exit the application. Optionally, main menu 10 may include additional information including, without limitation, hyperlinks, telephone numbers and electronic mail addresses to obtain additional assistance with running the application.

Figure 2:
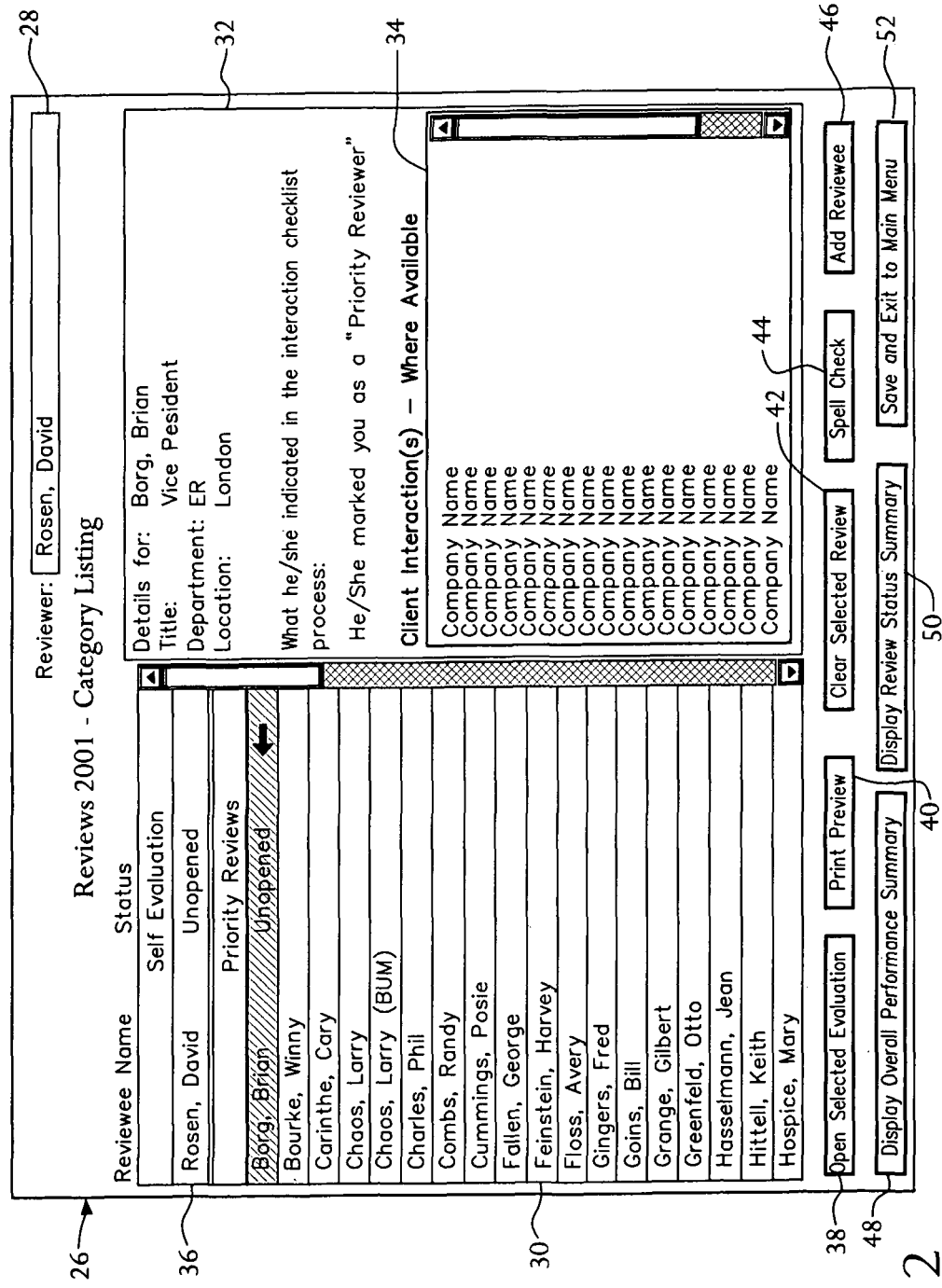
FIG. 2 is a computer generated window of a reviewer's list of reviewees to be reviewed using the system.

FIG. 2 is a Reviewee List menu 26 that identifies the reviewer at box 28 and a list of persons identified as "Priority Reviews", at box 30, that have selected the reviewer as a "Priority Reviewer". The terms "Priority Reviews" and "Priority Reviewer" are defined hereinafter. Priority Reviews box 30 also displays the status, i.e., "Unopened", "In Progress" or "Completed", of the reviewer's Priority Reviews. Reviewee List menu 26 preferably contains, in area 32, bibliographic information about the selected reviewee such as, for example, the reviewee's name, title, department and employment location. It will be understood that area 32 may be designed to accommodate less or more bibliographic information as may be desired or necessary. In addition, the Reviewee List menu 26 may be configured to include a box 34 containing a list of external clients/companies with which the selected reviewee has had business interaction prior to the retime of review. Reviewee List menu 26 also preferably contains a "Self Evaluation" box 36 that the user can click on to perform a personal evaluation of his or her own performance as part of the 360° employee review process.

Once a desired reviewee has been selected from box 30 or box 36, the reviewer may then click on an "Open Selected Evaluation" button 38 to launch a new review of a reviewee has review status is "Unopened" or to continue a previously existing but incomplete review that is still in progress. Clicking on a "Print Preview" button 40 invokes the "Print Preview" window shown in FIG. 11 and allows the reviewer to review the content of the selected reviewee's review for accuracy and completeness prior to printing or submitting the review information for processing and storage. Reviewee List menu 26 also preferably includes self-explanatory "Clear Selected Review" and "Spell Check" buttons 42 and 44, respectively. Clicking on an "Add Reviewee" button 46 allows the reviewer to invoke the "Add Roster-Interaction" menu of FIG. 16 whereby the reviewer can search a current roster of available persons to be added to his or her reviewer or reviewee lists. Activation of a "Display Overall Performance Summary" button calls up the "Overall Performance Summary" window of FIG. 10. Similarly, clicking on the "Display Review Status Summary" button 50 transfers the reviewer to the "Review Status Summary" window of FIG. 12. Lastly, the Reviewee List menu 26 also preferably includes a "Save and Exit to Main Menu" button 52 whose activation simultaneously saves all of the reviewers employment performance reviews in their current phases of completion and returns the reviewer to the main menu 10 of FIG. 1. The function and/or operation of the windows shown in FIGS. 10, 11, 12 and 16 will be discussed in greater detail hereinafter.

FIG. 3 is an overall job related evaluation category and rating window. This "Category Listing" window, identified by reference numeral 54, identifies the reviewee in box 56 and the reviewer in box 58. Category Listing window 54 also preferably displays key interaction information between the reviewer and reviewee, as well as ratings categories and ratings levels applicable to a currently open, and "In Progress" evaluation. Key interaction information may include the "Review Type", e.g., "Upward", "Downward" or "Peer", the reviewer's level of exposure to the reviewee, e.g., "Extensive", "Moderate" and "Limited", and the period(s) of time the reviewer worked with the reviewee, e.g., "All Year", Part of the Year". If the reviewer's exposure to the reviewee was for part of the preceding year, the "When" information will reflect one or more period(s) during the preceding year the reviewer worked with the reviewee.

Exemplary although not limitative job related evaluation categories may include some or all of "Skills Base", "Internal Leadership and Contribution", "Commercial Contribution and External Leadership" and Trend Since Last Review" and "Overall Evaluation/Future Potential" (and/or additional subcategories not listed but of importance to the business entity conducting the evaluation). The evaluation categories may also be subdivided into some or all of the illustrated subcategories (and/or additional subcategories not listed but of importance to the business entity conducting the evaluation). The ratings levels of reach subcategory may range from excellent/outstanding to poor/unacceptable and may expressed as an alphabetical or numerical scale or in some other fashion. By way of example and not limitation, Category Listing window 54 uses the ratings levels SE for "Substantially Exceeds", E for "Exceeds", M for "Meets", PM for "Partially Meets", DNM for "Does Not Meet" and N/A for "Not Applicable" or "Rating Not Specified". The ratings level entries appearing in Category Listing window 54 are generated by interaction of the reviewer with the Peer Group Ratings Page depicted in FIG. 5 and described below.

Category Listing window 54 also preferably includes a Spell Check button 60 for enabling the reviewer to invoke a spell checker program embedded in the application. Window 54 further includes buttons 62 and 64 for enabling the reviewer to mark the instant review as "In Progress" or "Completed", respectively, as well as a "Next" button 66 upon which the reviewer clicks when wanting to proceed to the next window in the application.

FIG. 4 shows an interactive window 68 which allows a reviewer to input reviewee interaction information into the system. Reviewee interaction information window 68 identifies the reviewee in box 70 and the reviewer in box 72 and enables the user to input the key reviewee interaction information, e.g., "Review Type", "Extent of Exposure", "Indicate When You Worked With Reviewee" and "If You Worked With Reviewee Only Part of the Year, Indicate Which Quarters", that is processed by the system and summarized in the Category List window 54 of FIG. 3. Window 68 further includes a "Next" button 74 for enabling the reviewer to proceed to the next window in the application.

FIG. 5 is a window defining standards for rating a reviewee relative to a reviewee's peer group for a specific job/profession and for allowing a reviewer to input such rating into the system. The display, which is identified generally by reference numeral 76, may be referred to as a "Peer Group Ratings Page". It will be appreciated that the standards defined in Peer Group Ratings Page 76 will vary considerably depending upon the peer group and industry/profession within which the reviewee is categorized. Peer Group Ratings Page 76 identifies the reviewee in box 78 and the reviewer in box 80 and enables the user to select, at performance rating boxes 82, the reviewee's performance rating relative to expectations for the reviewee's peer group. Page 76 further preferably includes a comment box 84 wherein the reviewer may input comments that the reviewer believes would be helpful to promote the reviewee's professional development.

Peer Group Ratings Page 76 includes self-explanatory "Previous" and "Next" buttons 86 and 88 to enable backward and forward movement by the reviewer through the application. Additionally, page 76 includes a "Return to Category Listing" button 90 that serves to return the reviewer to the Category List window 54 of FIG. 3 at which the performance rating from performance rating boxes 82 is automatically input by the system. Thereafter, the reviewer, while at the Category List window 54 of FIG. 3, selects another job related evaluation subcategory that he or she wishes to act upon by clicking on that subcategory which in turn returns the reviewer to Peer Group Ratings Page 76 of FIG. 5 at which the subcategory is defined and the reviewer enters a performance rating at one of boxes 82. This process is repeated (including providing commentary in comment box 84) as necessary for the reviewer to provide what he or she believes is sufficient information to create a fair and accurate assessment of the reviewee's job performance relative to his or her relevant peer group.

Peer Group Ratings Page 76 also desirably includes a button 92 that can be toggled between "Hide Comments" (as illustrated) and "Enter/Show Comments" (see button 126 of FIG. 7) which may be selectively deployed by the reviewer to show or hide certain comments that he or she may or may not to appear in the reviewee's annual performance review "book" or evaluation report.

Figure 6:
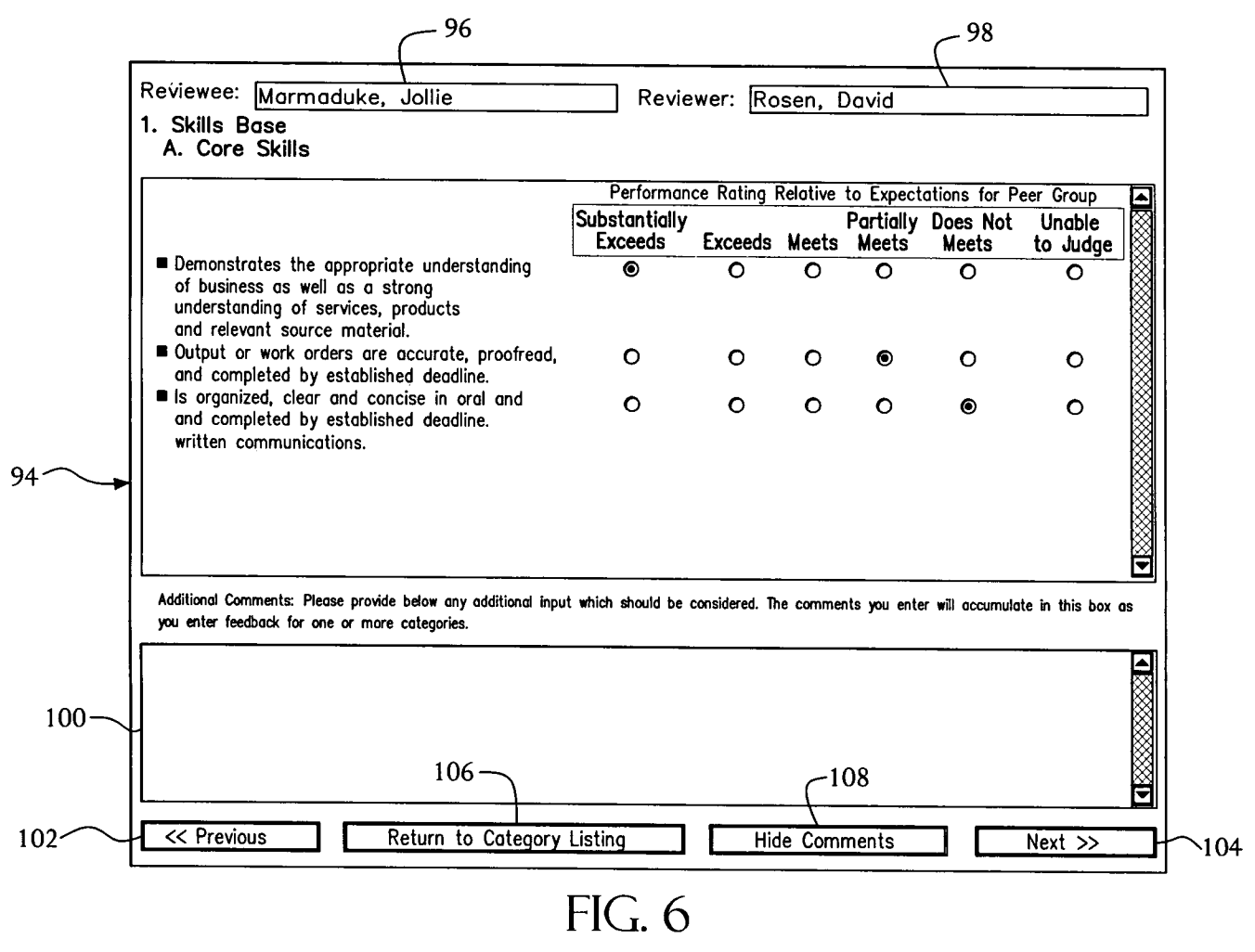

FIG. 6 shows an interactive Multi-Ratings Category Page 94 that contains a user-interactive computer generated window similar in operation and content to Peer Group Ratings Page 76 of FIG. 5. Multi-Ratings Category Page 94 allows the reviewer to provide ratings input regarding specific job related functions unique to the reviewee's job/profession. Page 94 identifies the reviewee in box 96 and the reviewer in box 98, and includes a comment box 100, a "Previous" button 102, a "Next" button 104. It also includes a "Return to Category Listing" button 106 and a "Hide-Enter/Show Comments" button 108 that function essentially the same as their counterparts in Peer Group Ratings Page 76 of FIG. 5, and also enable interplay between FIGS. 3 and 6 similar to that described above in connection with FIGS. 3 and 5.

Figure 7:
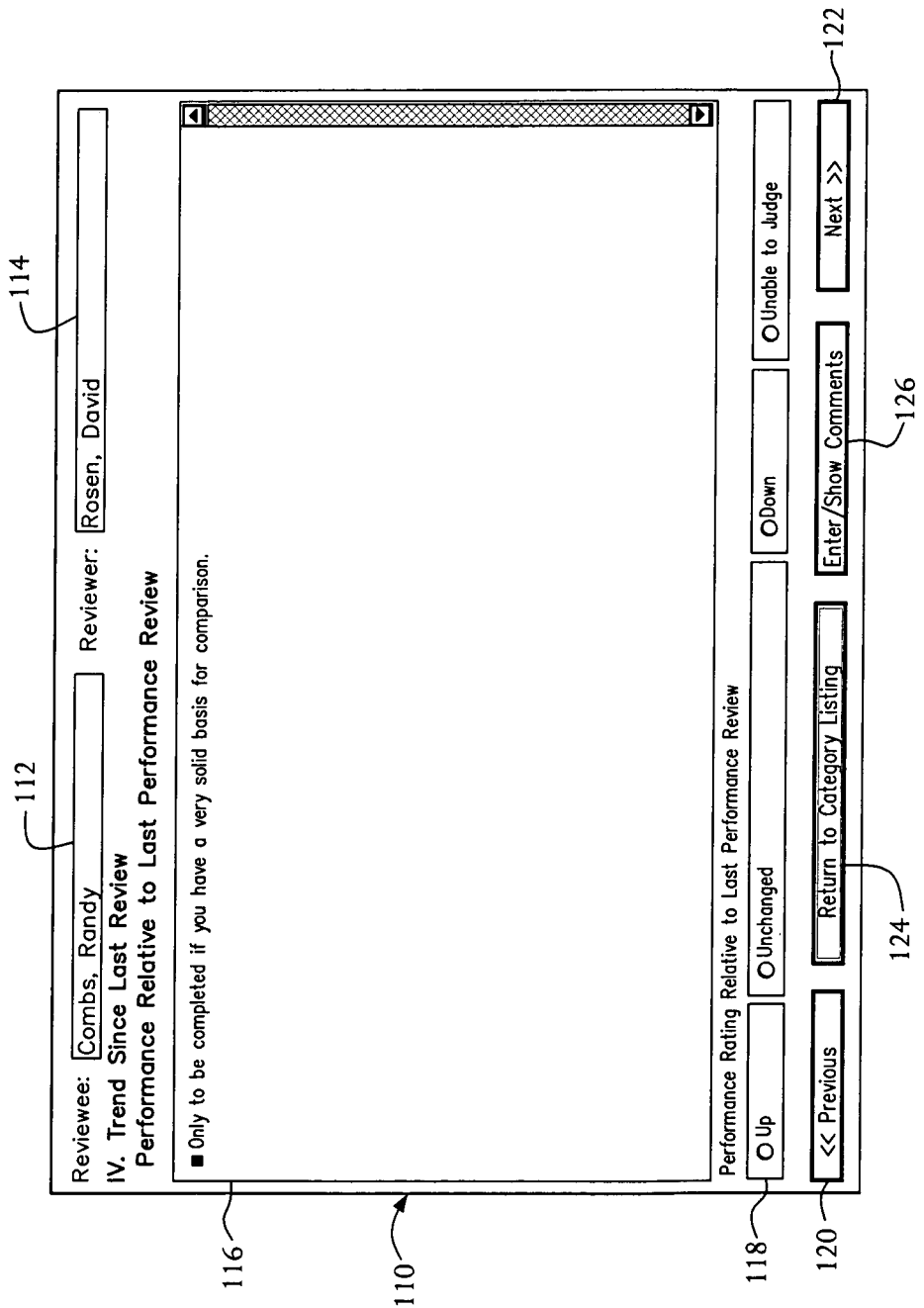
FIG. 7 is a computer generated window for enabling a reviewer to input job performance trends of a reviewee into the system.

FIG. 7 is an interactive computer generated window for enabling a reviewer to input job performance trends of a reviewee into the system. This figure reveals a Trend Rating Category window 110 includes Reviewee and Reviewer identifier boxes 112 and 114 and a comment box 116 into which a reviewer may input information that allows the reviewer to offer any bases reasons why the reviewer has identified trends in the reviewee's job performance which merit consideration. It is recommended that the reviewer only provide information in comment box 116 if the user has good and sufficient information upon which to make a trend comparison between one or more of the reviewee's prior performance evaluations and the present evaluation.

Trend Rating Category window 110 preferably includes multiple boxes 118, one of which may be selected by the reviewer to generally and qualitatively identify the predominant trend in the reviewee's job performance since his or her last performance review. Trends may be designated as "Up", "Unchanged", "Down" and "Unable to Judge". The Trend Rating Category window 110 also desirably includes a "Previous" box 120, a "Next" box 122, a "Return to Category Listing" box 124 and a "Hide-Enter/Show Comments" box 126 that function similarly to their counterparts in FIGS. 5 and 6.

FIG. 8 is an interactive window identified herein as Overall Rating and Comments window 128 for enabling a reviewer to input comments regarding a reviewee's effective aspects of performance into the system. Similar to previously described windows, window 128 include includes Reviewee and Reviewer identifier boxes 130 and 132. Window 128 is designed to allow the reviewer to provide specific input in comment box 134 concerning the top employment strengths of the reviewee. Conversely, comment box 136 is dedicated for enabling the reviewer to input action items that the reviewee should devote particular attention to in order to promote his or her professional development. Additionally, Overall Rating and Comments window 128 may include an optional comment box 138 to afford the reviewer the opportunity to input pertinent comments/suggestions concerning the reviewee's overall job performance that are not readily categorizable into comment boxes 134 and 136. Similar to previously described windows, Overall Rating and Comments window 128 includes "Previous", "Next" and "Return to Category Listing" buttons, identified respectively by reference numerals 140, 142 and 144 which function as described above.

FIG. 9 is an interactive computer window for enabling a reviewer to input into the system an overall performance rating for a reviewee relative to a reviewee's peer group. The window, identified as Overall Evaluation/Future Potential window 146 includes Reviewee and Reviewer identifier boxes 148 and 150. Window 146 allows the reviewer to input an overall performance rating for a reviewee relative to the reviewee's peer group by selecting one of the available performance rating categories set forth in boxes 152. Overall Rating and Comments window 128 may also include an optional comment box 154 to afford the reviewer the opportunity to input pertinent comments/suggestions concerning the reviewee's overall job evaluation/future potential that are not readily categorizable into any of the comment boxes of the previously described figures. And, similar to several other previously described windows, Overall Evaluation/Future Potential window 146 includes "Previous", "Next" and "Return to Category Listing" buttons, identified respectively by reference numerals 156, 158 and 160 which function as described above.

FIG. 10 illustrates a computer generated window which tabularly depicts an overall performance summary 162 of reviewees reviewed by a management-reviewer using the system and includes a Reviewer identifier box 164. The classifications of summary 162 may range from excellent/outstanding to poor/unacceptable and may expressed as an alphabetical or numerical scale or in some other fashion. By way of example and not limitation, Overall Performance Summary window 162 uses the ratings levels "Substantially Exceeds", "Exceeds", "Meets", "Partially Meets", "Does Not Meet" and "No Rating Given" or "N/A". Window 162 also preferably allows the reviewer to select a particular reviewee from the listed performance categories and open that person's performance evaluation by clicking on an "Open Selected Evaluation" button 166. Window 162 also desirably includes a "Return to Reviewee List" button 168 which if clicked on directs the reviewer to the Reviewee List window 26 of FIG. 2 whereby the reviewer can select another reviewee for evaluation.

FIG. 11 is a Print Preview window in HTML protocol of a particular reviewee's job performance rating that is identified generally by reference numeral 170. Print Preview window 170 preferably includes an area 172 itemizing bibliographic information about the reviewer and selected reviewee. Window 170 permits the reviewer the opportunity to review the results of particular reviewee's entire job performance evaluation. When working offline using a laptop computer or similar machine, a user can download the results of window 170 to a local printer or other output device. Window 170 preferably includes clickable buttons labeled as "Preview Next Review" 174 for enabling the reviewer to print preview the results of the next reviewee in the queue and a "Return to Reviewee List" button 176 whose actuation returns the reviewer to the Reviewee List menu 26 of FIG. 2.

FIG. 12 is a computer generated window of a numerical status report of the reviews completed or to be completed by a reviewer. The window, identified as Review Status Summary window 178 offers the reviewer a numerical breakdown of the number of reviews the reviewer is obligated to perform as well, the present status of those reviews and whether any of the reviews has been dedicated to be handwritten. Reviewee List menu 26 additionally includes a reviewer identifier box 180 and a "Return to Reviewee List" button 182 similar to those described hereabove.

FIG. 13 is an "Add Reviewee" window 184 for enabling a reviewer to input reviewees to be reviewed that are not already preloaded into the reviewer's review book. By way of explanation but not limitation, reviewees that are preloaded into a reviewer's review book are preferably those persons that are most likely to have had substantial exposure to the reviewer during the relevant evaluation period, e.g., managers, colleagues and subordinates that have had more than insubstantial contact with the reviewer during the period in question. Window 184 permits a reviewer to select alphabetically from a listing 186 of menu buttons A-Z whereby the reviewer can select by the first letter of a person's surname to add reviewees that are not for whatever reason already preloaded into a reviewer's review book. Accordingly, window 184 desirably includes a clickable "Add Reviewee" button 188 to permit the reviewer to add a selected non-preloaded reviewee to be added to the roster of persons the reviewer wishes to review, as well as a "Cancel" button 190 to cancel any non-roster reviewees that the reviewer has inadvertently or incorrectly identified as possible reviewees.

FIG. 14 is a computer generated window identified herein as the Preloaded/Added Interactions Checklist window 192. Checklist window 192 is one of the many significant components of the employment performance review system and process of the present invention. Employees use Checklist window 192 to specify whom they want to review and whom they want to be reviewed by. More particularly, Checklist window 192 includes a preloaded list of colleagues with which a participant in the system has had substantial job-related interactions and non-preloaded colleagues consciously added by the participant with whom the participant has had substantial job-related interactions. Preferably, Checklist window 192 includes certain bibliographic information about the preloaded and added colleagues. Additionally, Checklist window 192 preferably comprises a first listing 194 entitled or similarly identified as "Reviews Written Of You" that enables the participant to select persons whom the participant wishes to review his or her job performance (reviewers). Additionally, Checklist window 192 also includes a second listing 196 entitled or similarly identified as "Reviews Written By You" that enables the participant to select persons whose job performance the participant wishes to review (reviewees).

Key aspects of the Checklist window 192 are:
a) A set of tables that include lists of pertinent personnel information such as name, title, department, office location, product/function. The lists are derived from a set of preloaded interactions between the reviewees and the reviewers based on overlapping projects and clients or other business rules. Clicking on the words "Name/Title", "Dept", "Office" and the like alternately sorts their respective lists between ascending and descending alphabetical order.
b) A user can review the preloaded interactions and specify:
   a. Reviews of them (at listing 194): by clicking on one of options "Priority Review", "Review Requested" or "Review Not Needed".
   b. Reviews by them (at listing 196): by clicking on one of options "Review I Commit to Write" or "My Review Not Needed".
c) By clicking on "Add Interactions" button 198, a user can search the enterprise's personnel database in a number of ways to add other non-preloaded interactions (i.e., colleagues that are not preloaded into the system but with which the participant has had significant interaction). That is, by clicking on "Add Interactions" button 198, the user invokes the "Add Roster Interaction" window of FIG. 16 at which the user can locate and add interactions (colleagues) to review and/or be reviewed by the user, as described below. And, from the "Add Roster Interaction" window of FIG. 16, the user may proceed to the "Add Non-Roster Interaction" window of FIG. 17. A non-roster interaction is an interaction with an individual external to the reviewer's immediate domain, e.g., department or division.
d) By clicking on "Print Interactions" button 200, a user can print a report of their interaction list. The report reflects the current state of the user's interaction list and comprises the initial, preloaded interaction list and any subsequently added interactions. The report can be a summary report of the interactions that the user changed to be something other than "My Review Not Needed".
e) Users with appropriate permissions can impersonate other sets of users.
f) Business size, type and other parameters logically dictate the number of reviews a participant may commit to write and how many reviews the participant may request. These parameters also limit the number of Non-Roster interactions that the user may add based on process and/or position. Customizable "nag" boxes are preferably displayed depending upon the nature of the review, e.g., annual versus semi-annual and the user's job category/title.
g) By clicking on "Clear Interactions" button 202, users can clear preloaded interactions selections in listings 194 and 196 that they have not modified. Button 202 toggles between "Clear Interactions" and "Restore Interactions" depending on the state of the preloaded interactions. "Restore Interactions" will restore any preloaded interactions that have been previously cleared. Users can remove manually added interactions by clicking on "Remove Added Interactions" button 204. Similarly, users can review added interactions by clicking on "Show Added Interactions" button 206. Preloaded/Added Interactions Checklist window 192 also includes self-evident "Help" and "Exit Checklist" buttons 208 and 210, and a "Submit Checklist" button 212 that enables the user to submit his collection of reviewee/reviewer selections for processing, automatic system update and storage by the appropriate system data processor(s) and database(s).

The features described above can be customized in many ways. For instance, whether the employee is support staff, a professional, is departing from the enterprise, or whether the review is an annual or an interim, e.g., mid-year, evaluation can impact the user's permissible level of interaction with the system. By way of example but not limitation, interactions may be only one-way, i.e., a user might only be able to specify whom they want to be reviewed by or whom they commit to review.

Figure 18:
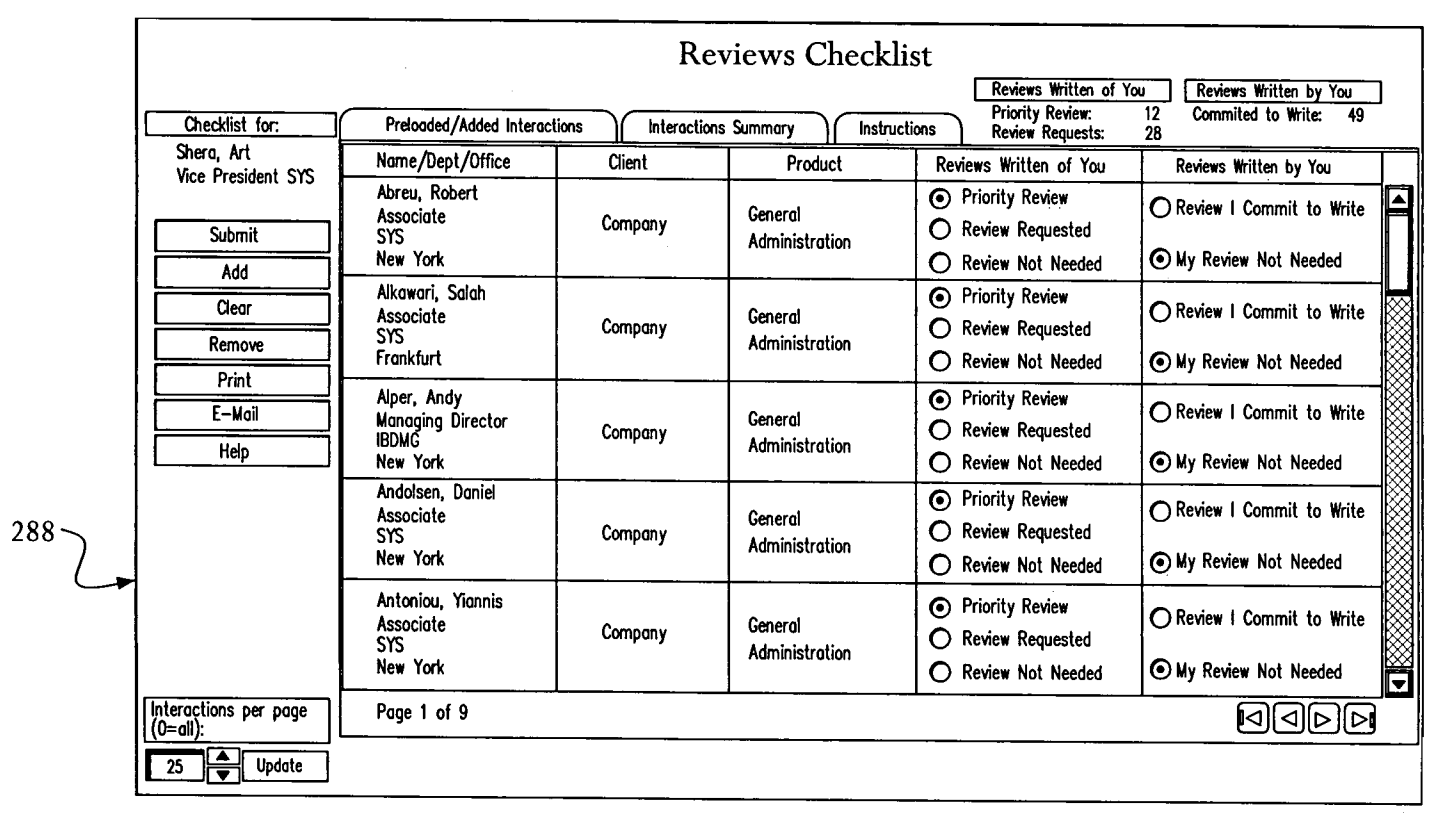

Preloaded/Added Interactions Checklist window 192 includes a "Preloaded Interactions" tab 214 which is shown as the active tab in FIGS. 14 and 18. Checklist window 192 also includes a "Summary of Interactions" tab 216 and a "Guidelines" tab 218 that the user may click on to call up, respectively, the window shown in FIG. 15 or guidelines for using the system, both of which are described below.

Preferably, the user will be allowed to specify the number of interactions per page. In operation, the user will scroll vertically and use navigation buttons to move between pages. The navigation buttons (|<, <, >, >|) are located at the bottom of the window and are only visible if the user has selected a number of interactions per page that is less than the number of preloaded interactions that are associated with the user. When 0 is entered as the number of interactions per page, all interactions are shown and the navigation buttons and page information are removed. When the screen cursor is over the navigation buttons, tool tip help will display the messages: "First Page", "Previous N Interactions", "Next N Interactions" or "Last Page". The user specifies the number of interactions per page and inputs that number by clicking on the "Apply" button 219 (located in the bottom left portion of window 192.

A significant advantage of the present system is that it has a mandatory management check designed to minimize "gaming" that is common among 360° employee review processes.

That is, the user must gain manager approval before the user's interaction checklist is finalized and submitted for inclusion in the reviews entry process. When the user clicks on the "Submit Checklist" button 212, of FIG. 14 or the "Submit Reviews" button 20 of FIG. 1, an electronic mail message is automatically sent to the user's manager notifying the manager of the submission. At this point the interaction checklist will be in a state of "pending approval". The manager will verify the interaction list for the user, and then can either approve or reject the list. If the manager approves the checklist, it will be set to the status of "Submitted". If the manager rejects the list, he or she must specify a reason for the rejection and the reason is sent back to the user via electronic mail. In that event, the checklist status will be reset to "Not Submitted". Once the user has submitted a checklist for approval, it cannot be altered. In addition, a manager cannot make modifications to the checklist, but can only approve or reject it. If rejected, the manager preferably has the capability to provide written feedback. If approved, it is desirable that the user be prompted to print a summary report for his or her records.

According to the invention, data will preferably be saved when:
a. An interaction is added or deleted.
b. N (this will be configurable) changes are made in Reviews Written of You or Reviews Written by You columns 194, 196 since the last save. A save resets the number of changes, regardless of the cause of the save.
c. The user moves to a different tab.
d. A user switches on/off instructions on startup.
e. A user clicks on a button in the navigation area.
f. A specified amount of time has elapsed (this will be configurable) since the last save.

FIG. 15 is a window summarizing those persons whom the participant has and has not selected to review his or her job performance (reviewers) and those persons whose job performance the participant has or has not selected to review (reviewees). This "Summary of Interactions" window is identified generally by reference numeral 220 and lists each interaction (colleague) in a column that shows what action the user has requested of them or promised to them. The "Summary of Interactions" window 220 further preferably includes self-explanatory "Help", "Print Interactions", "Exit Checklist" and "Submit Checklist" buttons 222, 224, 226 and 228.

Figure 16:
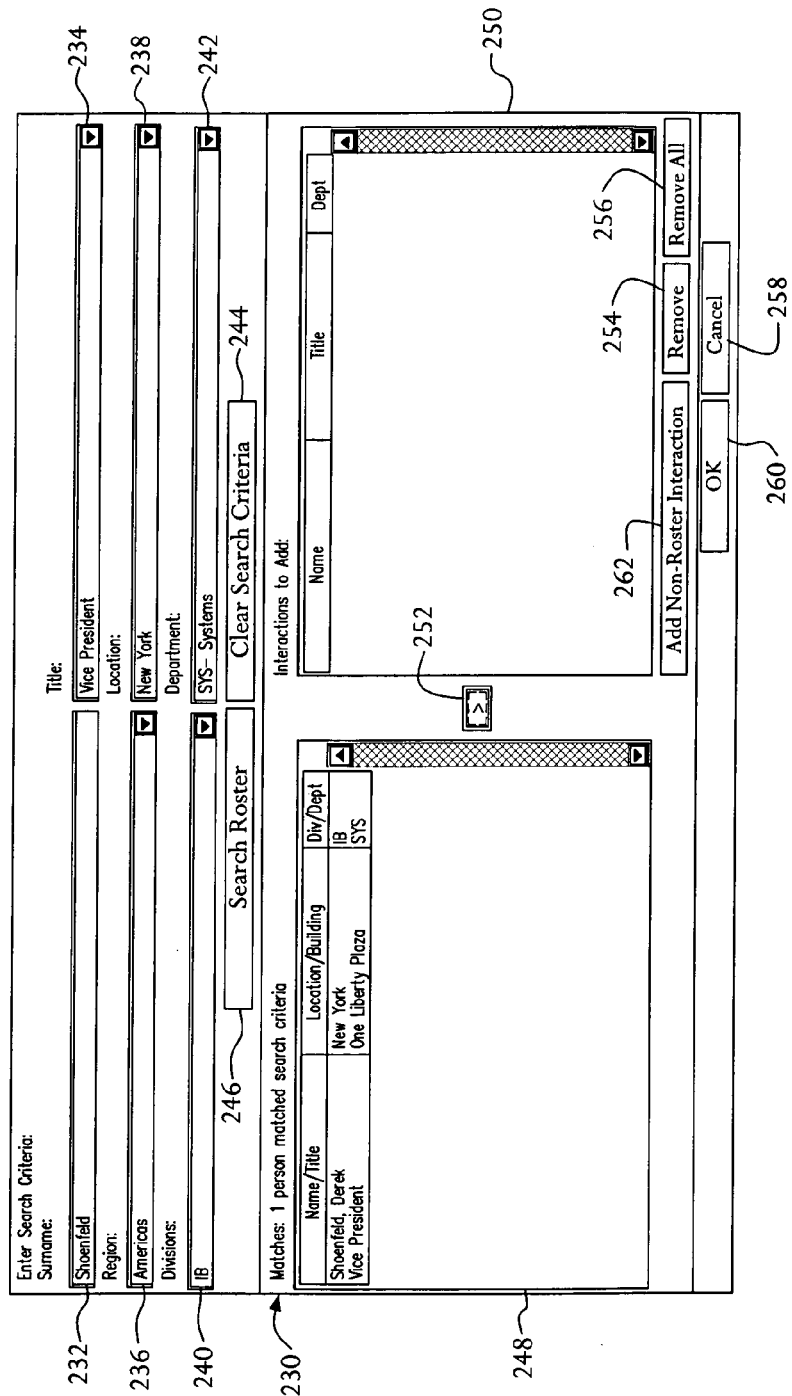
FIG. 16 is a computer generated window for enabling a participant to search a current roster of available persons to be added to his or her reviewer or reviewee lists.

FIG. 16 is an "Add Roster" window 230 for enabling a participant to search a current roster of available persons to be added to his or her reviewer or reviewee lists.

Upon clicking the "Add Interactions" button 198 of the Preloaded/Added Interactions Checklist window 192, the "Add Roster" window 230 of FIG. 16 is activated and the user is given the opportunity to add roster interactions. The search criteria section of the window preferably has several text boxes to perform the desired roster search that may include one or more of the following (or even other information that the enterprise might deem appropriate): "Surname" 232, "Title" 234, "Region" 236, "Location" 238, "Division" 240 and "Department" 242. The search criteria entered boxes 232-242 are preferably combined together using an AND operation. The contents of boxes 232-242 may be cleared by clicking on "Clear Search Criteria" button 244. This only clears the contents of boxes 232-242 and the "Matches" section described below. It does not clear items that may be listed in the "Interactions to Add" window (also described below).

If the user is satisfied with the search criteria, he or she clicks on the "Search Roster" button 246 and the system searches the appropriate database(s) for items that match the search criteria. There must be at least one search criteria field entered for the search to execute. And, if the "Surname" text box 232 is populated and by only one letter, a warning box appears and displays the message "You have specified only 1 character in the surname". This is an ambiguous search and will take a long time to run.

If the search results in a large number of returned records, a warning box will display a message informing the user that the search resulted in a large number of matches and that displaying the information may take a long time. The user will be advised to modify the search criteria to limit the number of returned records.

Results of the query are displayed in the "Matches" section 248. From this section, users can add one or more items from the search results to the "Interactions to Add" section 250 by clicking on each selected item to highlight the selected item and then clicking on the right arrow symbol ">" button 252. A selected item or all added interactions may be deleted from the "Interactions to Add" section 250 by clicking on the "Remove" button 254 or "Remove All" button 256, respectively. The user can cancel the search and exit the "Add Roster" window 230 at any time by clicking on the "Cancel" button 258. The contents of the "Add Roster" window 230 are added to the interaction list when the user clicks the "OK" button 260.

If the result of a search is empty, the user is prompted and asked if he or she would like to perform another add roster interaction search or an add non-roster interaction search. If the user clicks on the "Add Non-Roster Interaction" button, the Add Non-Roster Interaction window 264 shown in FIG. 17 appears.

As seen in FIG. 17, the Add Non-Roster Interaction window 264 includes several search criteria text boxes 266, 268, 270, 272, 274, 276, 278 and 280 into which the user may enter certain non-roster interaction search criteria such as "Surname", "First Name", "Client", "Product", "Title", "Office", "Division" and "Department". Window 264 also preferably includes an "EXPLANATION" text box into which the ser must input the nature and extent of the user's interaction with the selected non-roster colleague over the review period. The user clicks "OK" button 284 to add the person to the list of added interactions in the Interactions to Add box 250 of window 230 of FIG. 16. These non-roster interactions are then added to the user's interaction checklist when "OK" button 260 of FIG. 16 is clicked on.

Returning to FIG. 17, the user may cancel the non-roster interaction search by clicking on the "Cancel" button 286.

FIG. 18 is a computer generated window similar to that shown in FIG. 14 as would appear on a laptop computer when a participant is using the system while offline and disconnected from a corporate intranet or the World Wide Web. "Reviews Checklist" window 288 contains all of the information of its counterpart in FIG. 14 except that the name, title, department and office locations of the preloaded interactions are compressed into a single column rather than three columns. All other previously described windows appear to the offline user in the same form that they would appear to the online user. In this way the offline user experiences essentially the same look-and-feel of the application whether working online or offline.

In order to provide an application administrator with useful information on the extent, nature and efficiency of usage of the instant application, the following application usage events are preferably logged in the table usage:
a. Application Start.
b. Tab Change.
c. Print Summary.
d. Clear Interactions.
e. Restore Interactions.

f. Add Roster Interaction.
g. Add Non-Roster Interaction.
h. Delete Roster Interaction.
i. Delete Non-Roster Interaction.
j. Send e-mail summary.
k. Application Exit.
l. Help Button.
m. Switch On/Off instruction display at startup.
n. Added/Updated Non-Roster interactions.
o. Added/Updated Roster interactions.

The design of the search component should take into account that it could be used in the Reviews Entry application and the Book/Summary Driver application. With this in mind, the search criteria boxes should be customizable from an XML file. For example, the book driver program may need active_sub_group as criteria but the checklist program may not. A book driver program is a Web-based application used to collect information for data reporting, distribution, and shipping purposes (i.e., whose reviews are included in the final review book, what supplemental data files are needed, and who should receive review books for distribution as well as shipping information). The data collected from the application drives the entire back-end data processing, book production, shipping, and distribution processes. By contrast, in conventional 360° performance review programs these processes are completely manual and prone to error. Data reports may be produced using proprietary or commercially available programming applications using Crystal Reports or the like. The report format may include standard report calculations, trend information (preferably 3-years of review data if available), aggregate benchmark/comparison data, and various demographic views of an individual's performance data as well as written commentary.

Preloaded/Added Interactions Checklist window 192 of FIG. 14 and "Reviews Checklist" window 288 of FIG. 18 are defaulted such that their "Guidelines" tabs are activated upon invocation. When the "Guidelines" is active, a set of instructions is displayed. The instructions are preferably customizable based on reviewer attributes. Desirably, the user will have the option to switch off the instructions. If this option is selected, the preloaded "Preloaded Interactions" tab 214 (FIG. 14) will be the default tab.

The following are exemplary instructions or guidelines that may be provided to assist a user with using the Preloaded/Added Interactions Checklist window 192 of FIG. 14 and "Reviews Checklist" window 288 of FIG. 18. It will be understood that these guidelines may be customized to the enterprise's particular performance review needs and will be different for support staff, professionals and managers.

Guidelines for Completing your Checklist

To improve the quality of the written feedback that is collected, we want to reduce the number of reviews each person is asked to write, soliciting only those reviews that truly add value. Accordingly, please adhere to the following framework as you complete the two sections of your checklist:

Section I—Relates to who reviews you. All reviews have been marked initially Review Not Needed. If you want to be reviewed by the person, you must change the mark to Priority Review or Review Requested.

Priority Review—is one of the 10-20 evaluations without which your year-end developmental review will be incomplete. The evaluator must be thoroughly knowledgeable about your performance in most, if not all, respects and therefore able to provide a detailed and comprehensive written evaluation. You may designate a maximum of 20 Priority Reviewers.

Review Requested—this designation signifies two things: 1) that 10-20 Priority Reviews will not be sufficient to capture properly a full spectrum of feedback on your performance; and 2) that the individual being solicited for the additional review is sufficiently knowledgeable about your performance to provide input that will be not only specific and detailed but also, most importantly, incremental in evaluating your performance and facilitating your development.

Review Not Needed—this designation signifies either that you did not work with the person listed or, based on your direct interaction, that there is no compelling basis to solicit written feedback.

Important Note for Managing Directors: MDs should not complete Section I, "Reviews Written Of You," as this information has already been gathered through the firmwide MD review process.

Section II—Relates to whom you review. All reviews have been marked initially My Review Not Needed. If you want to review the person you must change the mark to Review I Commit to Write.

Review I Commit to Write—this designation signifies one of two things: 1) that you are thoroughly knowledgeable about the individual's performance in most, if not all, respects and therefore able to provide a detailed and comprehensive written evaluation; or 2) that you have significant insight into particular aspects of the person's performance such that your input will be incremental in a meaningful way. Without your feedback, this individual's year-end development review will be incomplete.

My Review Not Needed—indicates either that you did not work with the person listed or, based on your direct interaction, that your feedback could not add meaningfully to an assessment of the individual's performance or be materially helpful to his/her development. You should also use this designation if you have already submitted (or will shortly), through another division's review process, a review of the person listed.

For Managing Directors: When completing Section II, "Reviews Written By You", be sure to indicate all non-MD reviewees for whom you will provide feedback. However, do not include any fellow MDs because all reviews of MDs will be gathered through the firmwide MD review process.

For All Other Participants: Be Balanced in Completing Sections I and II—Please keep in mind that the number of reviews you "Commit to Write" will be audited against the number of "Priority Review" and "Review Requested" designations that you make. Accordingly, be extremely selective and ensure that your contribution to this process is properly balanced with what you are asking of your colleagues.

Your pre-loaded interaction checklist is comprised of people with whom you may have been on project and/or client teams with since [DATE]. The list reflects information gathered through the time sheet and other information. Accuracy of the list is a direct function of the quality of information received from team leaders and team members throughout the year and therefore may not be complete. You can add to your preloaded list any other people with whom you have worked closely since last year's review process if you feel strongly that you should be evaluating them and/or they should be evaluating you.

As mentioned above, if the user is included in a "coverage" table in the system's database, a list of employees that the user can impersonate is displayed and the user selects whom they want to impersonate. This function will have search capability similar to that described above for adding reviewers. The coverage table also specifies if the user can impersonate everyone or sets of users and if the user can add interactions. The following are presently preferred, although not limitative, database coverage table specifications.

Coverage Table/User Permissions Specifications

Two fields are used in the coverage table: id and covered_id. Covered_id maps to id in the "review personnel" or similar table in the system database.

a) If the entry has values id='Rjones' and covered_id='Bhiggins', the user Rjones can impersonate the user Bhiggins. Only people in a process that has a state of Checklist can be added.

b) If the entry has values id='Rjones' and covered_id='*', the user Rjones can cover everybody. Only people in a process that has a state of Checklist can be added.

c) If the entry has values id='Rjones' and covered_id='+', the user Rjones can cover support staff but cannot add interactions.

As an added convenience that serves to promote user participation, the application can be downloaded to a laptop so that the employee can work remotely, unconnected to the enterprise-wide network or the Internet. Several user prompts and error messages are preferably deployed to assist the user in navigating through the software as well as several on-line utilities helping the employee manage his/her review writing session. The Web-based application (either on the desktop or laptop) resides within a help Website which can be accessed anytime. Users can print a hardcopy of any or all reviews that they write. The present system preferably includes an online summary sheet of an individual's review data, electronic action plan, and an interim feedback application that can be delivered to senior management via the Web through a secured server using encryption technology. Preferably, the online summary sheet is a read/write document that the manager will use to capture salient points from an individual's review book (paper-based) in preparation of the review delivery discussion. The summary sheet will be electronically stored and accessed by various people having permissions thereto.

The action plan is preferably a read/write document that the reviewee will complete as directed by the manager or assigned mentor. As with the summary sheet, the action plan will be electronically stored and accessed by various people having permissions thereto.

The interim-feedback process allows the manager or mentor to create and send a "mini" developmental review process to reviewers in order to monitor the ongoing performance of any given individual on less than an annual basis. The interim-feedback process is a scaled down version of the annual or main review process and will recycle information and applications used in the annual review process. The obvious advantage of this capability is that it permits managers or mentors to receive interim feedback and generate interim action plans that could be used to constructively modify an employee's habits or behavior before they become serious problems that otherwise might not be discovered until the employee's yearly annual performance evaluation.

Several other benefits arise from the fully automated system of the present invention. For example, a fully integrated, systematic, simplified and objective data collection and delivery process ensures a higher-degree of data integrity compared to a manual, paper process. It also promotes higher participant compliance rates, faster response times and increased employee belief and trust in the fairness of the system. Additionally, the Web-based environment allows for "behind-the-scenes" changes without interrupting the user population.

The system described herein is not limited exclusively to the context of employee employment performance reviews. To the contrary, the system will also find beneficial application in employment surveys of all types. For example, the principles of the invention may be easily adapted to create and process surveys or questionnaires unrelated to job performance where individual, group, department, division or total enterprise input may be desirable for purposes of generating information that may be useful in improving a company's products/services, working conditions, efficiency, and so on.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. A computer system implemented method for conducting an employee performance review comprising:
   identifying, by a computer system, projects or clients associated with a user, wherein the user conducted employment related activities associated with the projects or the clients during a specified period of time;
   gathering, by the computer system, interaction data listing other parties associated with the projects or the clients during the specified period of time, wherein gathering the interaction data includes receiving the interaction data from a second user impersonating the user when a coverage table indicates that the second user has permission to impersonate the user;
   generating and preloading a list of reviewees for the user based on the gathered interaction data;
   receiving a selection of one or more of the reviewees from the preloaded list;
   updating employee performance review information on the selected reviewees received by the computer system;
   processing the updated employee performance review information on the selected reviewees;
   storing the processed employee performance review information; and
   generating, by the computer system, an overall performance summary of the selected reviewees based on the stored performance review information,
   wherein generating the overall performance summary comprises displaying a distribution of overall performance ratings of the selected reviewees.

2. The method of claim 1 further comprising receiving one or more reviewer selections from the user, wherein the selected reviewers include at least one of the user, a superior, a peer, a subordinate and one of the clients.

3. The method of claim 1, wherein said updating comprises updating of said employee performance review information over a communication network.

4. The method of claim 3 wherein the communication network is the Internet.

5. The method of claim 3 wherein the communication network is a business enterprise intranet.

6. The method of claim 3 further comprising updating the employee performance review information while the system is disconnected from the communication network.

7. The method of claim 1 further comprising requiring manager approval of the selected reviewees prior to the updating, processing and storing of the employee performance review information.

8. The method of claim 1, wherein the overall performance summary includes aggregate benchmark data.

9. The method of claim 1, wherein generating the overall performance summary comprises displaying, for each of the selected reviewees, an overall performance rating relative to an industry peer group of the selected reviewee.

10. A computer system implemented method for conducting employee performance reviews, comprising:
- identifying, by a computer system, projects or clients associated with work activities of a reviewer during an evaluation period;
- identifying, by the computer system, one or more reviewees that interacted with the reviewer during the evaluation period based on one or more of the projects or one or more of the clients, wherein identifying the one or more reviewees that interacted with the reviewer comprises receiving one or more reviewees from a second user impersonating the user when a coverage table indicates that the second user has permission to impersonate the user;
- generating and preloading, by the computer system, a list of the one or more reviewees;
- receiving by the computer system a selection of one or more of the one or more reviewees from the preloaded list;
- receiving by the computer system performance reviews of the selected reviewees, each review including performance ratings relative to expectations for respective reviewee's peer group;
- processing by the computer system the received performance reviews; and
- generating by the computer system an overall performance summary of the selected reviewees based on the processed performance reviews,
  - wherein generating the overall performance summary comprises displaying a distribution of overall performance ratings of the selected reviewees.

11. The method of claim 10, wherein the processing comprises identifying trends in each selected reviewee's job performance in comparison with that reviewee's prior performance reviews.

12. The method of claim 10, wherein one or more of the performance reviews includes an action item for the associated reviewee to follow up on.

13. The method of claim 10, further comprising:
- receiving from the reviewer a request to a manager for approval of the selected reviewees; and
- receiving from the manager a message approving the selected reviewees for performance reviews.

14. The method of claim 10, further comprising storing data related to the processed performance reviews.

15. The method of claim 10, further comprising receiving a selection of one or more non-preloaded reviewees that interacted with the reviewer during the evaluation period.

16. The method of claim 15, wherein the non-preloaded reviewees are identified by searching an employee roster using a plurality of search criteria.

17. The method of claim 10, further comprising updating the preloaded list of the reviewees by adding a list of reviewers associated with the projects or the clients.

18. The method of claim 17, further comprising receiving a selection of reviewees and reviewers from the updated preloaded list.

19. The method of claim 18, further comprising receiving a self evaluation from the reviewer.

20. A computer system for conducting employee performance reviews, comprising:
- a memory;
- a computer processor disposed in communication with the memory and configured to execute a plurality of processing instructions stored in the memory, wherein the instructions, when executed, direct the computer processor to:
  - identify projects or clients associated with a user, wherein the user performed employment related activities involving the projects or the clients during a specified period of time;
  - gather interaction data including identification of other parties involved with the projects or the clients during the specified period of time, wherein gathering the interaction data includes receiving the interaction data from a second user impersonating the user when a coverage table indicates that the second user has permission to impersonate the user;
  - generate and preload a list of reviewees for the user based on the gathered interaction data;
  - receive a selection of one or more reviewees from the preloaded list;
  - update employee performance review information on the selected reviewees received by the computer system;
  - process the updated employee performance review information on the selected reviewees;
  - store the processed employee performance review information;
  - generate an overall performance summary of the selected reviewees based on the stored performance review information; and
  - display a distribution of overall performance ratings of the selected reviewees.

21. The system of claim 20, wherein the instructions further direct the computer processor to receive one or more reviewer selections from the user, wherein the selected reviewers include at least one of the user, a superior, a peer, a subordinate and one of the clients.

22. The system of claim 20, wherein the update of the employee performance review information is facilitated by a communication network.

23. The system of claim 20, wherein the instructions further direct the computer processor to require manager approval of the selected reviewees prior to the updating, processing and storage of the employee performance review information.

24. A computer system for conducting employee performance reviews, the system comprising:
- a memory;
- a computer processor disposed in communication with the memory and configured to execute a plurality of processing instructions stored in the memory, wherein the instructions, when executed, direct the computer processor to:
  - identify projects or clients associated with work activities of a reviewer during an evaluation period;
  - identify one or more reviewees that interacted with the reviewer during the evaluation period based on one or more of the projects or one or more of the clients, wherein identifying the one or more reviewees that interacted with the reviewer comprises receiving one or more reviewees from a second user impersonating the user when a coverage table indicates that the second user has permission to impersonate the user;
  - generate and preload a list of the one or more reviewees;
  - receive a selection of one or more of the one or more reviewees from the preloaded list;

receive one or more performance reviews for the selected reviewees, each review including performance ratings relative to expectations for respective reviewee's peer group;

process the received performance reviews;

generate an overall performance summary of the selected reviewees based on the processed performance reviews; and display a distribution of overall performance ratings of the selected reviewees.

25. The system of claim 24, wherein the instructions further direct the computer processor to identify trends in each selected reviewee's job performance in comparison with that reviewee's prior performance reviews.

26. The system of claim 24, wherein one or more of the performance reviews includes an action item for the associated reviewee to follow up on.

27. The system of claim 24, wherein the instructions further direct the computer processor to:

receive from the reviewer a request to a manager for approval of the selected reviewees; and receive from the manager a message approving the selected reviewees for performance reviews.

28. The system of claim 24, wherein the instructions further direct the computer processor to store data related to the processed performance reviews.

29. The system of claim 24, wherein the instructions further direct the computer processor to receive one or more non-preloaded reviewees that interacted with the reviewer during the evaluation period.

30. The system of claim 24, wherein the instructions further direct the computer processor to update the preloaded list of the reviewees by adding a list of reviewers associated with the projects or the clients.

31. The system of claim 30, wherein the instructions further direct the computer processor to receive a selection of reviewees and reviewers from the updated preloaded list.

* * * * *